United States Patent Office 3,038,715
Patented June 12, 1962

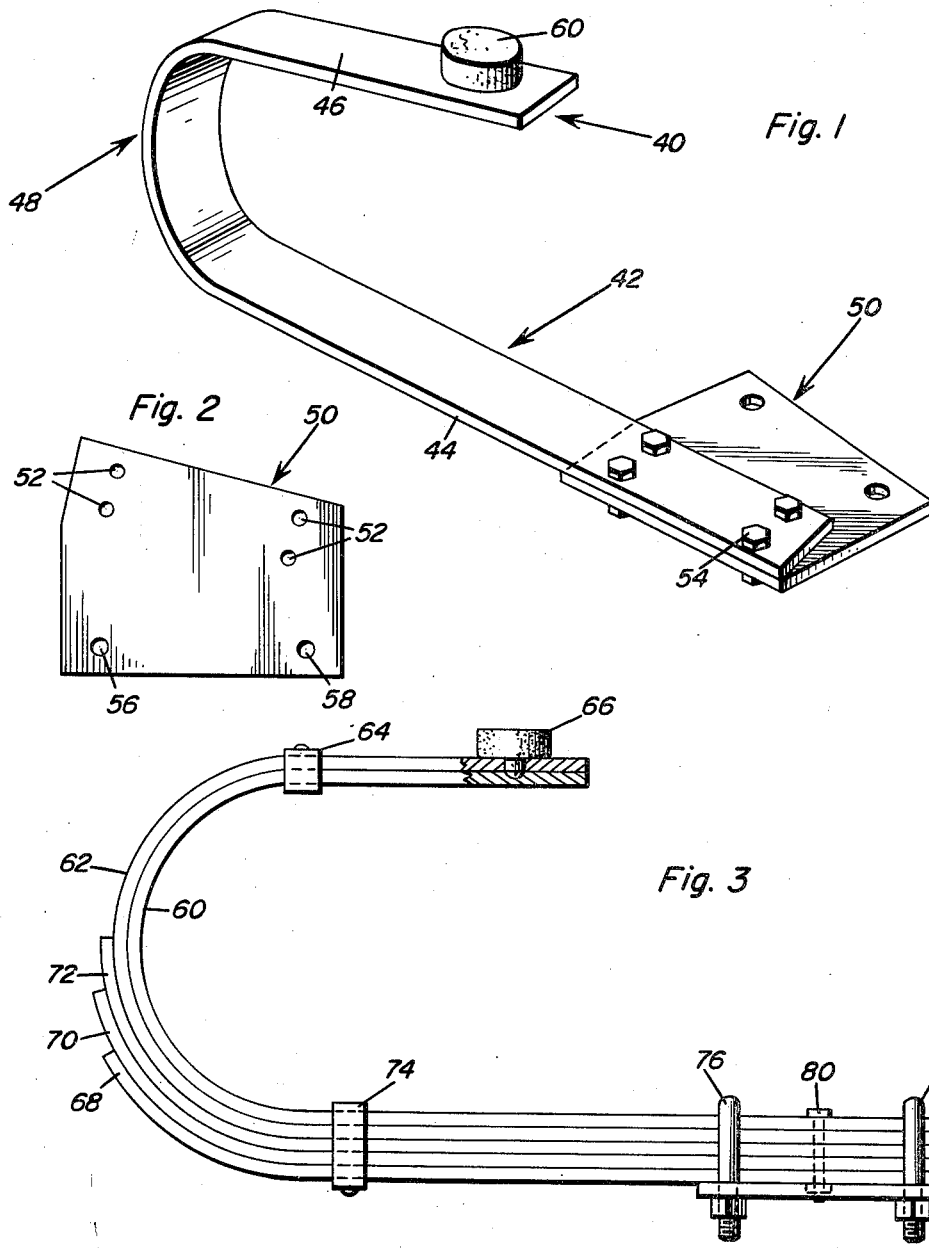

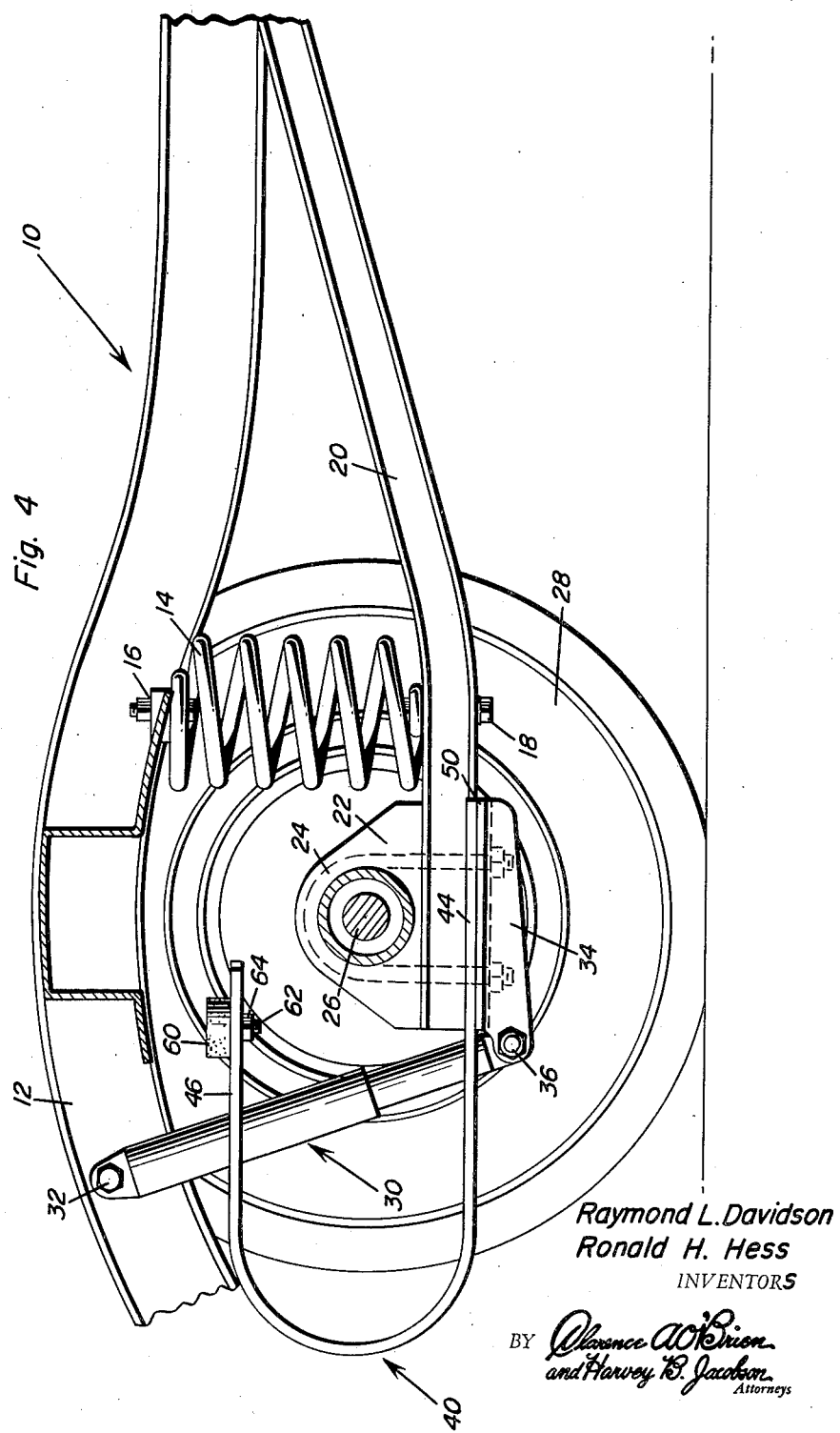

3,038,715
VEHICLE OVERLOAD SUPPORTS
Raymond L. Davidson, 529 W. Silver Eagle Road, North Sacramento 15, Calif., and Ronald H. Hess, 2450 Knoll St., Sacramento, Calif.
Filed June 21, 1960, Ser. No. 37,652
3 Claims. (Cl. 267—16)

This invention relates generally to vehicle equipment and more particularly to an independent overload support for vehicles.

Vehicles are generally provided with a bumper which acts to prevent the vehicle axle from contacting the vehicle chassis when there is an overloaded condition or the vehicle wheels strike a bump or such. There is a greater tendency, of course, for the axle to contact the chassis when the vehicle is both overloaded and subjected to a road obstruction. The possibility of engagement between the axle and the chassis requires that the driver exercise extreme care in order to avoid road obstructions. This requires that the driver slow the vehicle to an extremely slow speed when any bump or sudden obstruction is encountered. However, the driver is often not forewarned of the bump and the axle does strike the chassis. This of course is undesirable inasmuch as the passengers or cargo are jostled and severe sudden stresses are placed upon the axle, chassis and other vehicle parts. It is not possible to overcome this condition by utilizing heavier springs inasmuch as the heavier springs would render the normal vehicle spring action hard and uncomfortable.

In the light of the above, it is the principal object of this invention to provide a novel overload vehicle spring support which acts independently of the normal vehicle spring suspension to prevent engagement between the axle and chassis when the vehicle is overloaded.

It is a more particular object of this invention to provide an overload spring support for vehicles utilizing a rear coil spring suspension. The invention contemplates the provision of a substantially U-shaped spring metal bar which is secured at the end of its lower horizontal leg to the vehicle suspension bar. The upper leg is provided with bumper means which are engageable by the chassis when the vehicle is subjected to an overload.

It is a still further object of this invention to provide a novel vehicle overload spring support which is easy to install on vehicles utilizing said rear coil spring suspension. Moreover it is an object of this invention to provide a novel overload support which is inexpensive, reliable, and durable.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of a first form of the invention illustrating the generally U-shaped spring metal bar having a plate fastened at the free end of the horizontal lower leg and bumper means supported on the free end of the horizontal upper leg;

FIGURE 2 is a top plan view of the plate adapted to be secured to the U-shaped spring metal bar and the vehicle suspension bar;

FIGURE 3 is a side elevational view, partially broken away, showing a second form of the invention employing a plurality of superposed leaves;

FIGURE 4 is a fragmentary side elevational view showing the manner in which the first embodiment of the vehicle overload spring support is secured to a vehicle.

With continuing reference to the drawings initial attention is called to FIGURE 4 wherein numeral 10 generally represents a portion of a vehicle which may be for instance a 1960 model half-ton pick-up truck utilizing a rear end spring coil suspension. Numeral 12 generally refers to the vehicle chassis to which one end of the coil spring 14 is secured as at 16. A second end 18 of the coil spring is secured to a movable suspension bar 20. The suspension bar 20 is supported to the axle housing 22 by U-bolt 24. Axle 26 in axle housing 22 drives rear wheel 28. A shock absorber 30 is secured between the chassis 12 at 32 and a shock plate 34 at 36. The shock plate 34 is likewise fastened to the axle housing 22 by U-bolt 24.

The invention comprises the modification of the rear end spring coil suspension so as to include overload support characteristics. For this purpose, the spring overload support generally designated by the numeral 40 is provided. The spring overload support 40 includes a spring metal bar 42 bent upon itself to form a U-shaped member defining a lower horizontal leg 44, an upper horizontal leg 46, and a web or bight portion 48 therebetween. The lower and upper legs 44 and 46 are flat as illustrated and extend from the bight portion 48 in parallel horizontal planes. It is to be noted however that the bar 42 is slightly twisted so that the upper leg 46 extends at approximately a 20° angle to the lower leg 44. It is of course desired that a pair of spring supports be utilized in conjunction with each vehicle. The left spring support would define an upper leg 46 which extends to the left or side of the vehicle at a 20° angle while the right overload spring support would define an upper leg extending at a 20° angle toward the right side of the vehicle. For use in half-ton and three-quarter ton 1960 model pick-up trucks, it is contemplated that the over-all length of the bar 42 be 30 inches with the upper leg 46 being considerably shorter than the lower leg 44 as shown in the drawings. The lower leg 44 is provided with four spaced apertures. A plate 50 defines apertures 52 alignable with the apertures formed in the lower leg 44. Bolt fasteners 54 extend through the aligned lower leg apertures and plate apertures for fastening the plate 50 beneath the flat horizontal leg 44. The plate 50 is further provided with spaced apertures 56 and 58. It is to be noted that the straight-line defined between the apertures 56 and 58 extends at approximately a 20° to 30° angle with respect to the lower leg 44 when the plate 50 is fastened to the lower leg 44 by the bolt fasteners 54. The U-bolt 24 extends through the apertures 56 and 58 in the plate which is fitted between the shock plate 34 and the suspension bar 20. It will be appreciated therefor that the lower leg 44 will not extend parallel to the U-bolt 24 nor exactly perpendicular to the axle 26.

Rubber bumper means 60 are provided with a threaded shank 62 passed through an aperture defined in the free end of the upper leg 46. A nut 64 secures the bumper means to the leg 46. When the vehicle is not loaded, the bumper 60 is disposed approximately two or three inches beneath the vehicle chassis. When loading the truck, the weight forces the truck frame or chassis down to meet the bumper 60 and the overload spring support 40 helps support the chassis along with the coil spring 14. As noted, the bar 42 is formed of spring metal. The plate 50 is preferably formed of black mild iron.

Attention is now called to FIGURE 3 wherein a modification of the form of the invention shown in FIGURE 1 is illustrated. The embodiment in FIGURE 3 is similar in construction and utilization to that in FIGURE 1 and the installation procedure and manner utilized in conjunction therewith is identical to that described above in connection with the embodiment of FIGURE 1. The embodiment of FIGURE 3 however is distinguishable inasmuch as a pair of U-shaped spring metal bars 60 and 62 are superposed upon each other and secured together by a keeper or clamp 64 between the web portion and the upper leg. A bumper 66 is supported on the free end of the upper legs in the manner shown in FIGURE 1 or by any means readily available. A plurality of shorter leaves 68, 70 and 72 are superposed beneath the spring metal bars 60 and 62 proximate the web portion and lower leg. A keeper or clamp 74 is utilized to hold the various leaves together. In lieu of the bolt fasteners 54 utilized in FIGURE 1, U-bolts 76 and 78 are employed about the plurality of leaves. Moreover, a central bolt 80 extends through all of the leaves for holding the springs in place. Of course, the embodiment of FIGURE 3 is utilized with heavier loads and vehicles larger than three-quarter ton.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An overload spring support for vehicles utilizing rear coil spring suspension and including a suspension bar having a shock absorber base supported therefrom; said overload spring support comprising a bar of spring metal bent back on itself to define a generally U-shaped member having upper and lower horizontal legs connected by a semi-circular bight portion, a plate, fastener means securing an edge of said plate to said lower leg at the free outer end thereof, and bumper means supported proximate the outer end of said upper leg, means detachably securing another edge of said plate between said vehicle suspension bar and said shock absorber base, said spring metal bar extending rearwardly from said suspension bar.

2. An overload spring support for vehicles utilizing rear coil spring suspension and including a suspension bar having a shock absorber base supported therefrom; said overload spring support comprising a bar of spring metal bent back on itself to define a generally U-shaped member having upper and lower horizontal legs connected by a semi-circular bight portion, a plate, fastener means securing an edge of said plate to said lower leg at the free outer end thereof, and bumper means supported proximate the outer end of said upper leg, means detachably securing another edge of said plate between said vehicle suspension bar and said shock absorber base, said spring metal bar extending rearwardly from said suspension bar, said last named means including a pair of spaced apertures defined in said other edge of said plate, a U-bolt extending over an axle housing, through said suspension bar and said spaced apertures, said spaced apertures receiving said bolt defining a line therebetween at an angle of 20 to 30° with respect to said lower leg.

3. An overload spring support for vehicles utilizing rear coil spring suspension and including a suspension bar having a shock absorber base supported therefrom; said overload spring support comprising a bar of spring metal bent back on itself to define a generally U-shaped member having upper and lower horizontal legs connected by a semi-circular bight portion, a plate, fastener means securing an edge of said plate to said lower leg at the free outer end thereof, bumper means supported proximate the outer end of said upper leg, a plurality of bent leaf springs engaged in a superposed relationship with said spring metal bar, clamps securing said leaf springs to said bar, one of said springs being substantially the same length as said bar and the remaining springs being shorter than said bar and of different lengths.

References Cited in the file of this patent

UNITED STATES PATENTS

| | | |
|---|---|---|
| 2,301,398 | Haynes | Nov. 10, 1942 |
| 2,791,419 | Whalen | May 7, 1957 |
| 2,826,407 | Scheublein et al. | Mar. 11, 1958 |